US008223943B2

(12) United States Patent
Alexandrov et al.

(10) Patent No.: US 8,223,943 B2
(45) Date of Patent: Jul. 17, 2012

(54) SYSTEMS AND METHODS FOR COMPUTER AND VOICE CONFERENCE AUDIO TRANSMISSION DURING CONFERENCE CALL VIA PSTN PHONE (75) Inventors: Albert Alexandrov, Goleta, CA (US); Florian Winterstein, Santa Barbara, CA (US)

(73) Assignee: Citrix Systems Inc., Fort Lauderdale, FL (US)

( * ) Notice: Subject to any disclaimer, the term of this patent is extended or adjusted under 35 U.S.C. 154(b) by 733 days.

(21) Appl. No.: 12/423,467

(22) Filed: Apr. 14, 2009

(65) Prior Publication Data
US 2010/0262267 A1 Oct. 14, 2010

(51) Int. Cl.
H04M 3/42 (2006.01)
H04M 9/08 (2006.01)
(52) U.S. Cl. ............... 379/202.01; 379/406.01
(58) Field of Classification Search ............. 379/202.01, 379/201.01, 205.01, 406.01; 370/352
See application file for complete search history.

(56) References Cited

U.S. PATENT DOCUMENTS

| 5,553,083 | A | 9/1996 | Miller |
| 5,727,002 | A | 3/1998 | Miller |
| 5,764,235 | A | 6/1998 | Hunt et al. |
| 5,826,025 | A | 10/1998 | Gramlich |
| 5,845,265 | A | 12/1998 | Woolston |
| 5,956,027 | A | 9/1999 | Krishnamurthy |
| 6,081,829 | A | 6/2000 | Sidana |
| 6,167,432 | A | 12/2000 | Jiang |
| 6,246,758 | B1 | 6/2001 | Low |
| 6,249,291 | B1 | 6/2001 | Popp et al. |
| 7,013,327 | B1 | 3/2006 | Hickman et al. |
| 2002/0112004 | A1* | 8/2002 | Reid et al. .................... 709/205 |
| 2003/0140159 | A1 | 7/2003 | Campbell |
| 2007/0041366 | A1* | 2/2007 | Vugenfirer et al. ........... 370/352 |
| 2010/0279266 | A1* | 11/2010 | Laine et al. .................. 434/350 |

FOREIGN PATENT DOCUMENTS

EP 1718103 A1 11/2006
WO WO 2008/036950 A2 3/2008

OTHER PUBLICATIONS

"CU-SeeMe Software Product," Brought to you by the Cu-SeeMe Development Team of the Advanced Technologies and Planning group of the Network Resources Division of Cornell Information Technologies, pp. 1-8 (1995).
"ORCA Video Conferencing System", Manual Written by the National Oceanic and Atmospheric Administration's Office of Ocean Resources Conservation and Assessment for Operation of the CU-SeeMe System, 26 pages (1995).

(Continued)

Primary Examiner — Thjuan K Addy
(74) Attorney, Agent, or Firm — McDermott Will & Emery LLP (57) ABSTRACT A new approach is proposed that contemplates systems and methods to support canceling audio streams leaked from a speaker to a PSTN so that only the audio stream of a presenter or viewer speaking at a conference call is transmitted. Here, the audio streams being canceled includes the audio stream of an application being run or a material being presented online during a web conference. The voice audio stream of a presenter or viewer is then transmitted in addition to the computer audio stream, clean from any other audio stream of echoes or feedbacks captured by the hosting device during the conference call.

22 Claims, 8 Drawing Sheets

OTHER PUBLICATIONS

Abdel-Waha et al., "XTV: A Framework for Sharing X Window Clients in Remote Synchronous Collaboration," IEEE Conference, pp. 1-15 (1991).

Chen et al., "Real Time Video and Audio in the World Wide Web", 1995.

Bolot et al., "Scalable Feedback Control for Multicast Video Distribution in the Internet," SIGCOMM 94, London England, pp. 58-67 (1994).

Cox, "Global Schoolhouse Project," http://www.virtualschool.edu/mon/academia (2010).

Crowley et al., "MMConf: An Infrastructure for Building Shared Multimedia Applications," Proceedings of the 1990 ACM Conference on Computer—Supported Cooperative Work, pp. 329-342 (1990).

Delgrossi et al., "Media Scaling for Audiovisual Communication with the Heidelberg Transport System," Conference Proceedings of the first ACM International Conference on Multimedia, pp. 99-104 (1993).

Dorcey, "CU-SeeMe Desktop Videoconferencing Software," Connexions The Interoperability Report, 9: 42-45 (1995).

Ensor et al., "Control Issues in Multimedia Conferencing," IEEE Conference, pp. 133-143 (1991).

Ensor et al., "The Rapport Multimedia Conferencing System—A Software Overview," Proceedings of the 2nd IEEE Conference, pp. 52-58 (1988).

Maly et al., "Mosaic+XTV = CoReview," Computer Networks and ISDN Systems, pp. 1-19 1995.

McCanne et al., "Receiver-Driven Layered Multicast," ACM SIGCOMM, pp. 1-14 (1996).

Sattler, "Internet TV with CU-SeeMe", Book, 323 pages (1995).

Savetz et al., "MBONE: Multicasting Tomorrow's Internet," IDG Books Worldwide, Inc., (1996).

Acoustic Echo Control Considerations for Video Teleconferencing; C.S. Ravishankar and M. Onufry; pp. 161-189; Jan. 1, 1994.

US 5,715,404, 02/1998, Katseff et al. (withdrawn)

* cited by examiner

SYSTEMS AND METHODS FOR COMPUTER AND VOICE CONFERENCE AUDIO TRANSMISSION DURING CONFERENCE CALL VIA PSTN PHONE

RELATED APPLICATIONS

This application is related to U.S. patent application Ser. No. 12/423,451 filed concurrently and entitled "System and methods for computer and voice conference audio transmission during conference call via VoIP device," by Albert Alexandrov et al. and is hereby incorporated herein by reference.

BACKGROUND

A conference call is a telephone call between two or more callers or users (referred to herein as a group of participants) at geographically distributed locations, which allows each participant to be able to speak to, and listen to, other participant(s) simultaneously. A conference call among a plurality of participants can be conducted via a voice conference bridge or centralized server, which connects numerous endpoint devices (VoIP devices or PSTN telephones) associated with the participants using appropriate communication protocols and mixes the various incoming voice streams from the plurality of participants either at the endpoint devices or at the conference bridge.

A Web conferencing tool enables the group of participants to organize and attend meetings online during a conference call by allowing a presenter in the group of the participants at the conference call to run a computer application or present a material via a hosting device and share the application or material with the rest of the group (the viewers) to view in real time. For non-limiting examples, such web conferencing tool enables the presenter to perform live demonstrations in real time, collaborate on documents with colleagues, and provide training to customers and employees.

During the Web conferencing, an outgoing audio stream of the material being presented and/or the application being run via the hosting device (also referred to herein as the computer audio) may often need to be transmitted to the conference in addition to, and in separation from, an outgoing voice conference audio stream of the presenter or viewer speaking at the conference call (also referred to herein as the presenter or viewer audio, respectively). In the meantime, an incoming voice audio stream needs to be received from the rest of the group speaking at the conference call (also referred to herein as the voice conference audio). When there are more than one person need to listen to and/or to speak at the conference call at the same location as the presenter or the viewer, the presenter or viewer may have to "open up" the conference call by using a separate speaker associated with the hosting device. Consequently, the computer audio may leak from the speaker to the PSTN phone together with the presenter or viewer audio, causing deterioration in the audio quality of the conference call. Conversely, it is important to make sure that the two outgoing audio streams—the computer audio and the presenter or viewer audio are transmitted separately without interfering with one another.

The foregoing examples of the related art and limitations related therewith are intended to be illustrative and not exclusive. Other limitations of the related art will become apparent upon a reading of the specification and a study of the drawings.

DETAILED DESCRIPTION OF EMBODIMENTS

The approach is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

A new approach is proposed that contemplates systems and methods to support canceling audio streams leaked from a speaker to a PSTN device so that only the audio stream of a presenter or viewer speaking at a conference call (presenter or viewer audio) is transmitted. Here, the audio streams being canceled includes the computer audio stream of an application being run or a material being presented online during a web conference (computer audio). The voice audio stream of a presenter or viewer is then transmitted in addition to the computer audio stream, clean from any other audio stream of echoes or feedbacks captured by the hosting device during the conference call. Such an approach enables "clean" transmission of presenter/viewer audio without mixing of audio streams from other sources during a web conference at which open speakers are used (in place of an integrated headset) and multiple audio streams are captured, leaked into, or mixed with one another.

As used herein, "canceling" means suppressing and removing with the best effort from one audio stream the echo and feedback of another. The resulting audio stream after such cancellation effort is considered as "clean" even if certain residue of the echo and feedback may possibly remain.

Figure 1A:
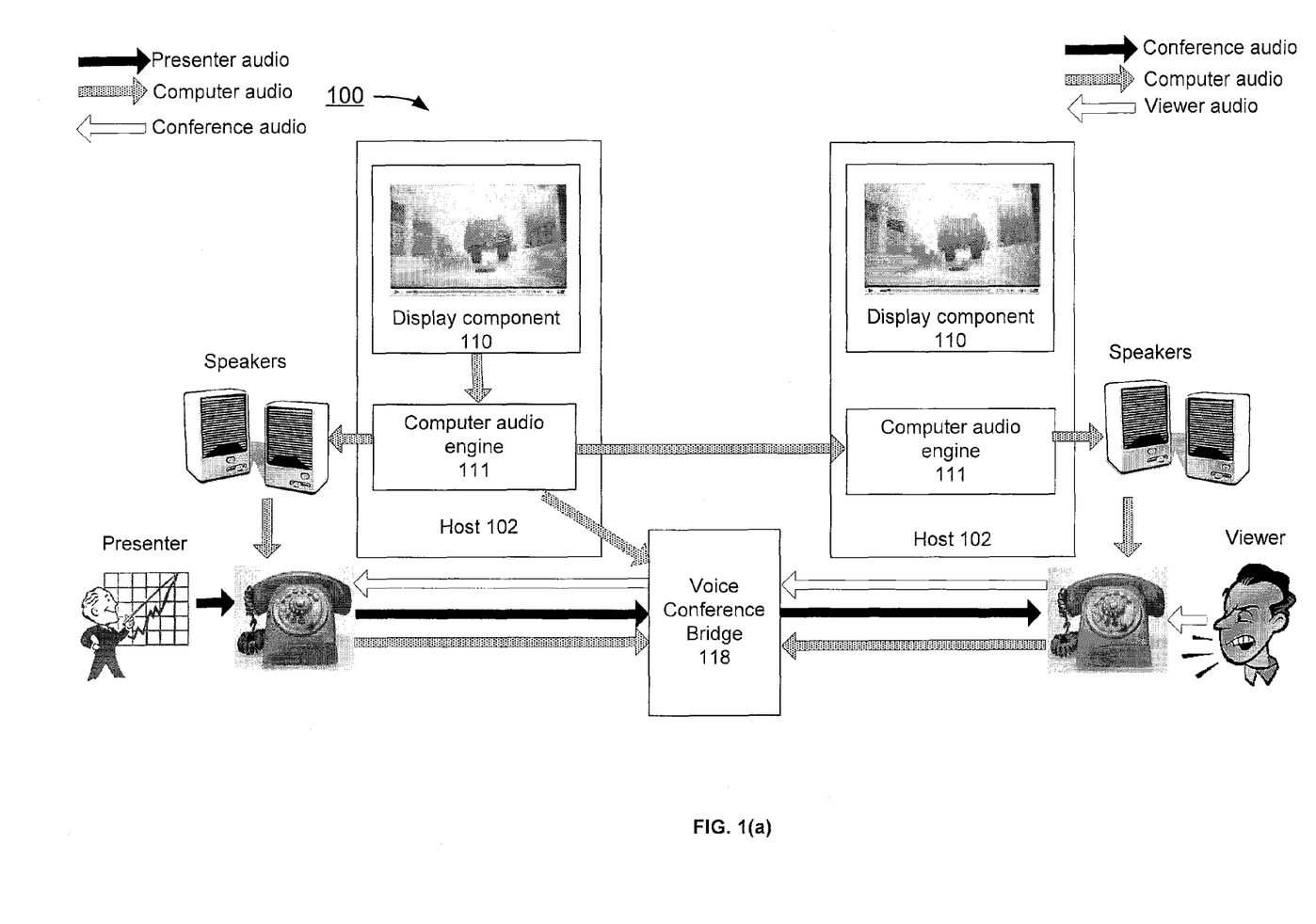
FIGS. 1(a)-(b) depict examples of diagrams of system to support clean transmission of voice audios between a presenter and a viewer conferencing through PSTN phones.

FIG. 1(a) depicts an example of a diagram of system to support clean transmission of voice audios between a presenter and a viewer conferencing through PSTN devices. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks. Although both the presenter and the viewer conference via their respective PSTN devices, it will be apparent to one skilled in the art to enable either of them to use an VoIP device instead under the teaching of the US application entitled "System and methods for computer and voice conference audio transmission during conference call via VoIP device," filed concurrently and incorporated by reference.

In the example of FIG. 1(a), the system 100 includes hosts (hosting devices) 102 deployed for each of a presenter and a viewer at a conference call, wherein various components running on each host 102 include at least an optional display component 110, and a computer audio engine 111; and a voice conference bridge 118 running on a separate host.

As used herein, the term "engine", "component", or "bridge" refers to a software, firmware, hardware, or other component that is used to effectuate a purpose. The engine, component, or bridge will typically include software instructions that are stored in non-volatile memory (also referred to as secondary memory). When the software instructions are executed, at least a subset of the software instructions is loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical.

In the example of FIG. 1(a), the host 102 can be a computing device, a communication device, a storage device, or any electronic device capable of running a software component. For non-limiting examples, a computing device can be but is not limited to, a laptop PC, a desktop PC, a tablet PC, an iPod, a PDA, or a server machine. A storage device can be but is not limited to a hard disk drive, a flash memory drive, or any portable storage device. A communication device can be but is not limited to a mobile phone.

In the example of FIG. 1(a), the optional display component 110 enables the presenter to display, manipulate, and share an application he/she runs or a material he/she presents at the conference call and the viewer to hear or view the application run or material presented by the presenter. Here, the display component 110 can be a monitor, a screen, or any other displaying device associated with the host 102 known to one skilled in the art. The application or material can be any type of digital document, application, or program that produces sound and/or displayable on the display component 110 of the host 102, including the entire displayable desktop of the host 102.

In the example of FIG. 1(a), the computer audio engine 111 is a software component that utilizes one or more sound capturing devices of the host 102, such as a sound card or on the host 102, a separate physical device of a microphone and/or a speaker, to capture and/or to playback audio streams by invoking Application Programming Interfaces (APIs) to the sound capturing devices, such as the Window APIs.

In the example of FIG. 1(a), the voice conference bridge 118 is operable to provide conferencing services over a communication network by establishing a conference call among a group of participants including at least a presenter and one or more viewers, receiving and mixing communication (voice, video, and/or data) signals generated by each of the group of participants, and providing the mixed signals to each of the group of participants. Here, each of the group of participants is able to both simultaneously listen to and to speak to the rest of the participants in the group while listening and/or watching the application or material presented on the display component 110 of the host 102 during the conference call. Here, each of the group of participants may represent a group of people gathering at a geographically distributed location, such as a conference room or office, where everyone in the group can listen to or speak to the conference call via a telephony endpoint device.

In the example of FIG. 1(a), the hosts 102 and the voice conference bridge 118 can communicate and interact with each other via communication interfaces (not shown) following certain communication protocols, such as TCP/IP protocol, over a network (not shown). Here, the network can be a communication network based on certain communication protocols, such as TCP/IP protocol. Such network can be but is not limited to, internet, intranet, wide area network (WAN), local area network (LAN), wireless network, Bluetooth, WiFi, and mobile communication network. The physical connections of the network and the communication protocols are well known to those of skill in the art.

While the system 100 depicted in FIG. 1(a) is in operation, a presenter and viewer participate in a conference call by speaking a presenter or viewer audio stream to the conference and listening to conference audio from other participants at the conference call through the voice conference bridge 118 via their associated PSTN phones. A first host 102 is associated with the presenter during the conference call, where the optional display component 110 of the first host enables the presenter to display, manipulate, and share a presentation material or an application at the conference call. While the application is being run and/or the material is being presented, a computer audio engine 111 of the first host 102 provides an audio stream of the application or material to one or more speakers and transmits the computer audio stream to a viewer at the conference call over a separate channel. During the conference call, the computer audio may leak from the speakers to the PSTN phone associated with the presenter and a mix of the computer audio and the presenter audio is captured by the voice conference bridge 118 as a result. For transmission of clean presenter audio to the conference call, the computer audio engine 111 may further provide the computer audio stream to other engines or components, such as the voice conference bridge 118, for the purpose of canceling the computer audio leaked from the speakers through the PSTN phone associated with the presenter from the mix of the presenter audio and the computer video captured by the voice conference bridge 118. Correspondingly, a second host 102 is associated with the viewer during the conference call, where an optional display component 110 of the second host receives and displays the presentation material or application originated by the presenter to the viewer at the conference call. While the material is being shared with the viewer, the computer audio engine 111 of the second host accepts the incoming computer audio stream for the viewer to listen to and feeds the computer audio to one or more speakers at the second host 102. Similar to the presenter side, the computer audio may leak from the speakers to the PSTN phone associated with the viewer and a mix of the computer audio and the viewer audio is captured by the voice conference bridge 118 as a result. For transmission of clean viewer audio to the conference call, the voice conference bridge 118 cancels the computer audio leaked from the speakers through the PSTN phone associated with the viewer from the mix of the viewer audio and the computer video captured by the voice conference bridge 118.

Figure 2A:
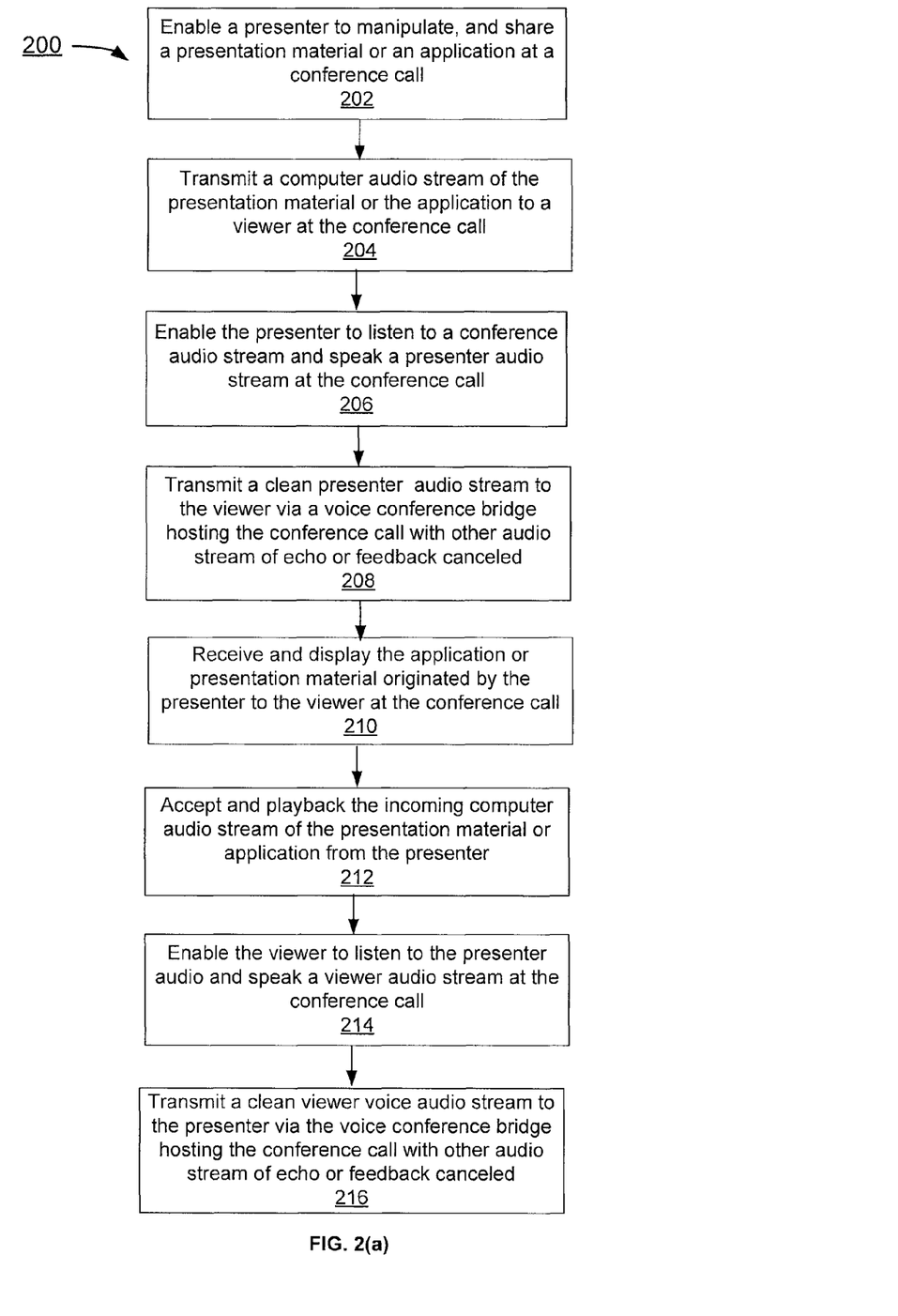
FIGS. 2(a)-(b) depict flowcharts of examples of processes to support clean transmission of voice audios between a presenter and a viewer conferencing through PSTN phones.

FIG. 2(a) depicts a flowchart of an example of a process to support clean transmission of voice audios between a presenter and a viewer conferencing through a hosting device in accordance with FIG. 1(a). Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 2(a), the flowchart 200 starts at block 202 where a presenter is enabled to manipulate, share, and optionally display a presentation material or an application at a conference call. The flowchart 200 continues to block 204 where an outgoing computer audio stream of the application or presentation material is transmitted to a viewer at the conference call. The flowchart 200 continues to block 206 where the presenter is enabled to listen to a conference audio stream and speak a presenter audio stream of him/herself at the conference call. The flowchart 200 continues to block 208 where a clean outgoing presenter voice audio stream of the presenter is transmitted to the viewer via a voice conference bridge hosting the conference call with other audio stream of echo or feedback canceled. The flowchart 200 continues to block 210 where the application or the presentation material originated by the presenter is received and optionally displayed to the viewer at the conference call. The flowchart 200 continues to block 212 where the incoming computer audio stream of the application or presentation material from the presenter is received and played back to the viewer. The flowchart 200 continues to block 214 where the viewer is enabled to listen to the presenter audio and speak a viewer audio stream of him/herself at the conference call. The flowchart 200 ends at block 216 where a clean outgoing viewer voice audio stream is transmitted to the presenter via the voice conference bridge hosting the conference call with other audio stream of echo or feedback canceled.

Figure 1B:
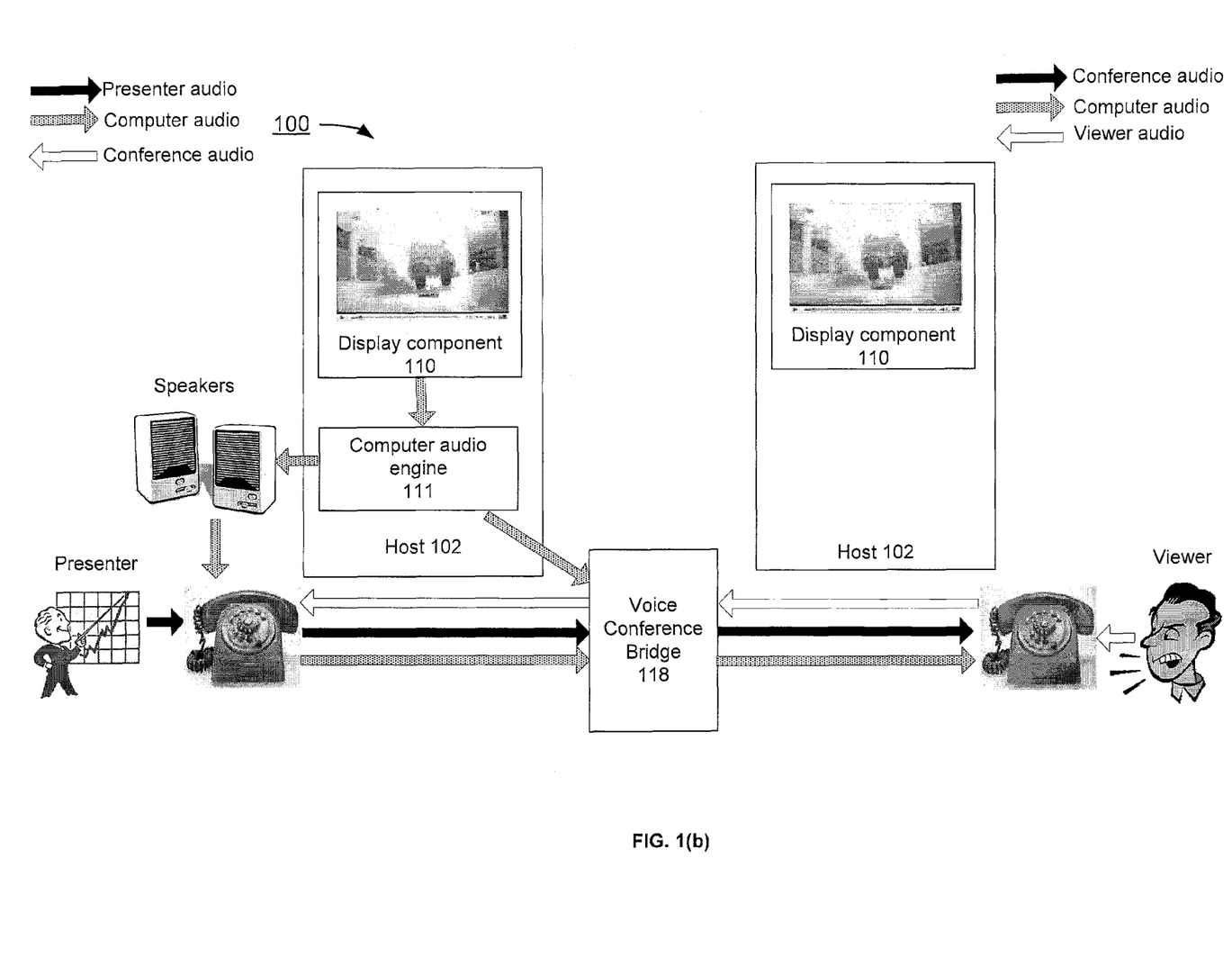

FIG. 1(b) depicts an alternative example of a diagram of system to support clean transmission of voice audios between a presenter and a viewer conferencing through PSTN devices. While the system 100 depicted in FIG. 1(b) is in operation, similar to the system 100 depicted in FIG. 1(a), the voice conference bridge 118 accepts the computer audio stream from the computer audio engine 111 for the purpose of canceling the computer audio leaked from the speakers through the PSTN phone associated with the presenter from the mix of the presenter audio and the computer video captured. Unlike the system depicted in FIG. 1(a), however, the computer audio engine 111 in FIG. 1(b) provides the computer audio stream exclusively to the voice conference bridge 118 instead of sending the computer audio stream to the viewer over a separate channel. The voice conference bridge 118 further mixes the clean presenter audio following noise cancellation with the computer audio stream and transmits the mix of the presenter and computer audio to the conference. Accordingly, the viewer now received the computer audio from the PSTN phone, instead of from the computer audio engine 111 on the second host, together with the clean presenter audio stream. Consequently, there is no need to utilize the computer audio engine 111 on the second host or the speakers associated with the second host during the conference. Since there is no leakage of computer audio from the speakers to the PSTN phone associated with the viewer, there is no need or concern about echo cancellation for transmission of a clean viewer audio to the conference under the system depicted in FIG. 1(b)

Figure 2B:
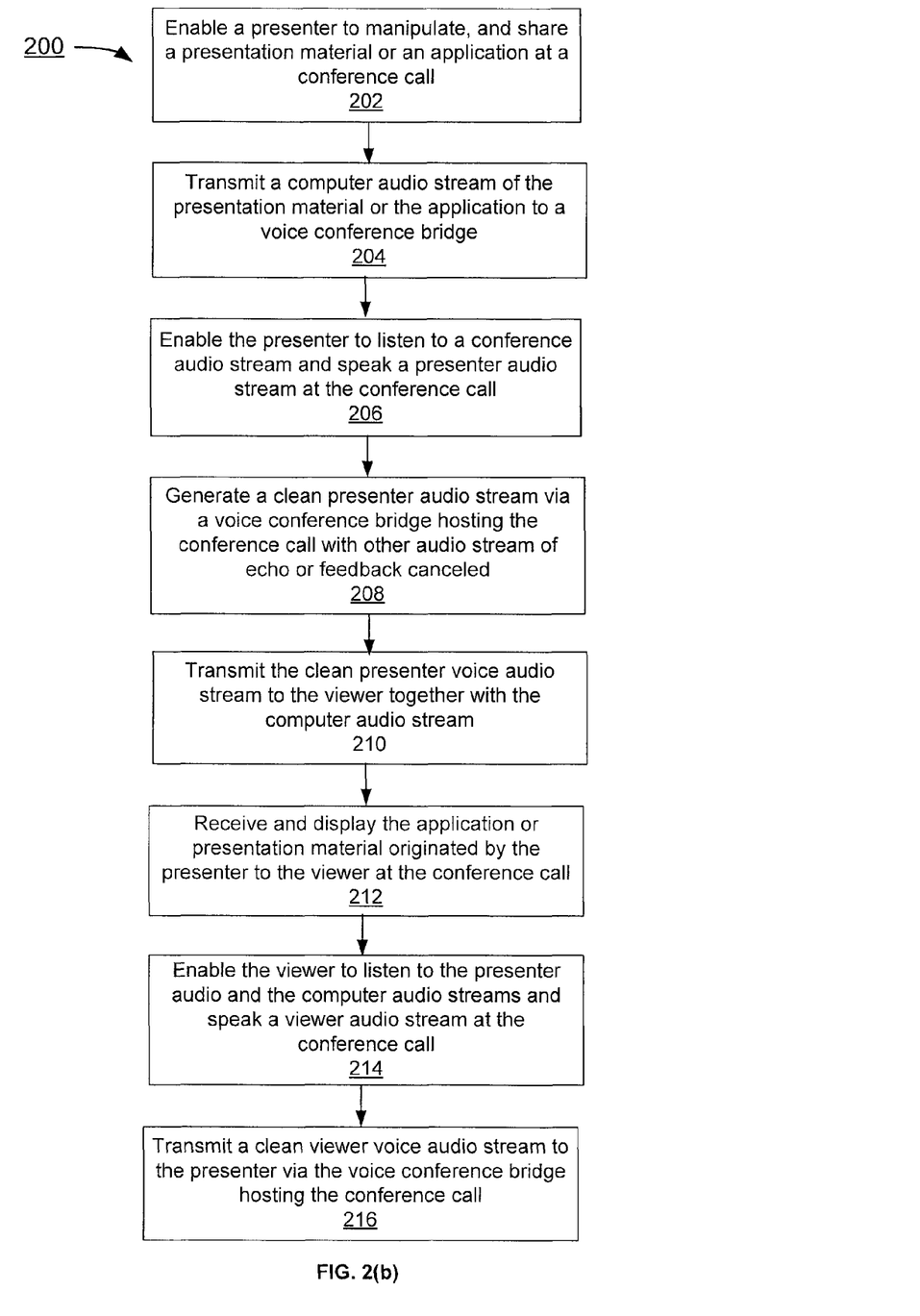

FIG. 2(b) depicts a flowchart of an example of a process to support clean transmission of voice and computer audios between a presenter and a viewer conferencing through a hosting device in accordance with FIG. 1(b). In the example of FIG. 2(b), the flowchart 200 starts at block 202 where a presenter is enabled to manipulate, share, and optionally display a presentation material or an application at a conference call. The flowchart 200 continues to block 204 where an outgoing computer audio stream of the application or presentation material is transmitted to a voice conference bridge. The flowchart 200 continues to block 206 where the presenter is enabled to listen to a conference audio stream and speak a presenter audio stream of him/herself at the conference call. The flowchart 200 continues to block 208 where a clean outgoing presenter voice audio stream of the presenter is generated via the voice conference bridge hosting the conference call with other audio stream of echo or feedback canceled. The flowchart 200 continues to block 210 where the clean presenter voice audio stream is transmitted to the viewer by the voice conference bridge together with the computer audio stream. The flowchart 200 continues to block 212 where the application or the presentation material originated by the presenter is received and optionally displayed to the viewer at the conference call. The flowchart 200 continues to block 214 where the viewer is enabled to listen to the presenter audio and the computer audio streams and speak a viewer audio stream of him/herself at the conference call. The flowchart 200 ends at block 216 where the viewer voice audio stream is transmitted to the presenter via the voice conference bridge hosting the conference call.

PSTN Conferencing—Presenter Side

Figure 3:
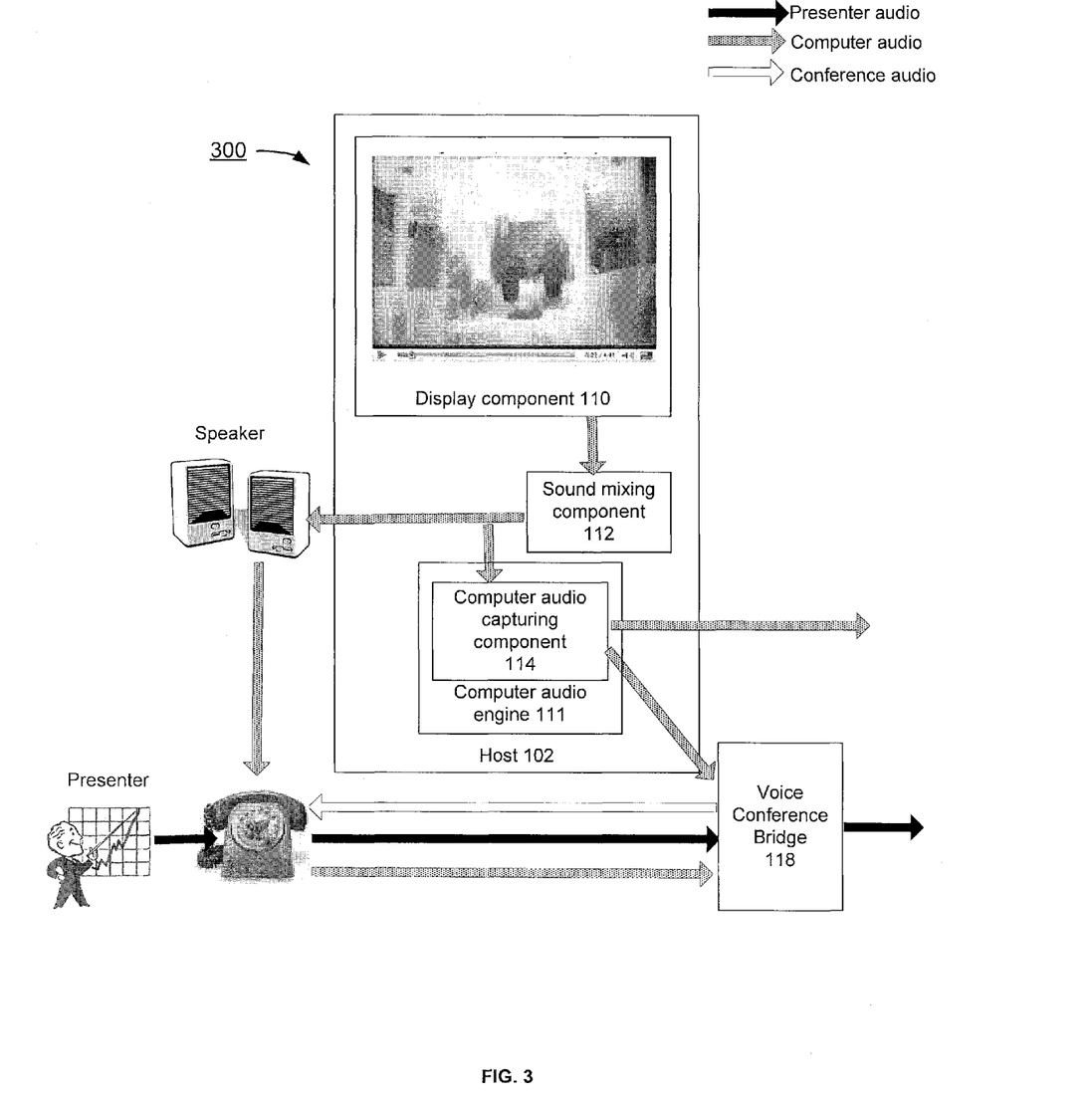
FIG. 3 depicts an example of a diagram of system to support canceling computer audio from voice audio of a presenter conferencing through a PSTN phone.

FIG. 3 depicts an example of a diagram of system 300 to support canceling computer audio from voice audio of a presenter who is conferencing through a PSTN phone. In the example of FIG. 3, the system 300 includes host (hosting device) 102, various components running on the host 102, including at least an optional display component 110, a sound mixing component 112, and a computer audio engine 111 that includes at lest a computer audio capturing component 114, and a voice conference bridge 118 running on a separate host.

In the example of FIG. 3, the sound mixing component 112 is a software component that utilizes one or more sound capturing devices of the host 102, such as a sound card of the host 102, by invoking interfaces to the sound capturing devices. More specifically, the sound mixing component 112 mixes all audio streams that have been either originated or accepted by an application, program, or interface running on the host 102, such as the computer audio and/or the conference audio, and outputs the mixed audio streams to an audio output device such as the speaker as shown in FIG. 3. In addition, it may also provide the audio streams to other components, such as the computer audio capturing component 114 of the computer audio engine 111 via respective APIs.

In the example of FIG. 3, the computer audio capturing component 114 of the computer audio engine 111 is a software component that captures audio streams from the output of the sound mixing component 112 and/or from another audio generating source running on the host 102. In addition, the computer audio capturing component 114 process the audio streams it captures, and outputs the processed audio stream to an output channel/device or alternatively to the same voice conference bridge 118 as shown in FIG. 3.

While the system 300 depicted in FIG. 3 is in operation, a PSTN telephone enables a presenter to participate in a conference call by listening to and speaking at the conference call via the voice conference bridge 118. The display component 110 of the host 102 enables the presenter to display, manipulate, and share a presentation material or an application at the conference call. During the conference call, the sound mixing component 112 of the host 102 captures and outputs the computer audio of the application or material to a speaker for the presenter to listen to. In addition, the sound mixing component 112 also provides the computer audio to the computer audio capturing component 114 of the computer audio engine 111. The computer audio capturing component 114 then captures from output of the sound mixing component 112 the computer audio and outputs the captured audio stream to the viewer via a separate conference channel as well as to the voice conference bridge 118. From the presenter's side, the voice conference bridge 118 captures from the PSTN telephone one or more of: a the presenter audio and the computer audio leaked from the speaker through the PSTN phone of the presenter. In addition, the voice conference bridge 118 also captures the computer audio stream from the output of the computer audio capturing component 114. The voice conference bridge 118 then cancels the computer audio stream from the mix of the presenter audio stream and the computer audio stream, and transmits a clean presenter audio stream to the rest of the group of participants at the conference call with the computer audio and other audio streams of echoes and feedbacks canceled. Optionally, the voice conference bridge 118 may also transmit the computer audio stream together with the presenter audio stream to the rest of the group of participants at the conference call as discussed above.

Figure 4:
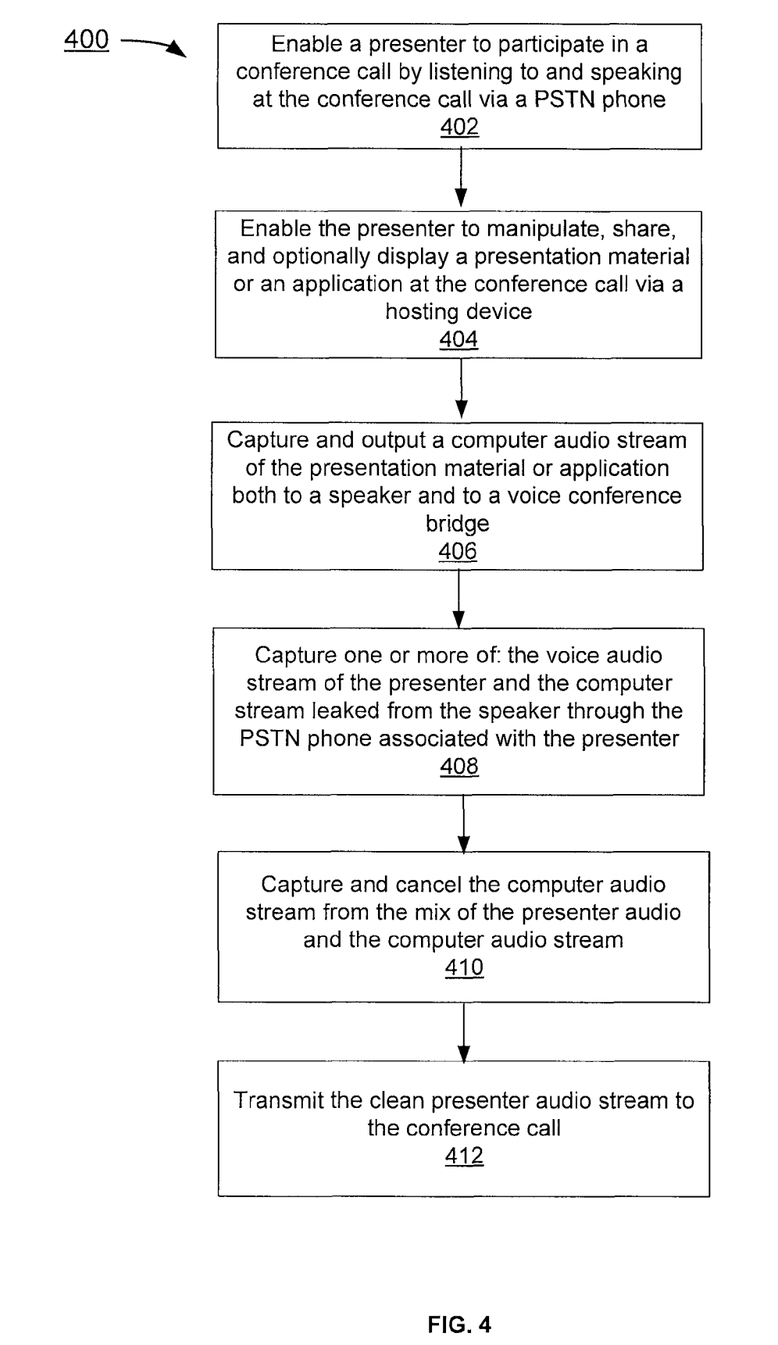
FIG. 4 depicts a flowchart of an example of a process to support canceling computer audio from voice audio of a presenter conferencing through a PSTN phone.

FIG. 4 depicts a flowchart of an example of a process to support canceling computer audio from voice audio of a presenter conferencing through a PSTN phone. In the example of FIG. 4, the flowchart 400 starts at block 402 where a presenter is enabled to participate in a conference call by listening to and speaking at the conference call via a PSTN phone. The flowchart 400 continues to block 404 where the presenter is enabled to display, manipulate, and share a presentation material or an application at the conference call via a hosting device. The flowchart 400 continues to block 406 where a computer audio stream of the application or material is captured and output to both a speaker and to a voice conference bridge hosting the conference call. The flowchart 400 continues to block 408 where one or more of: the voice audio of the presenter and the computer audio leaked from the speaker through the PSTN telephone associated with the presenter are captured by the voice conference bridge. The flowchart 400 continues to block 410 where the computer audio is separately captured and canceled from the mix of the presenter audio and the computer audio by the voice conference bridge. The flowchart 400 ends at block 412 where a clean presenter audio stream is transmitted to the rest of the group of participants at the conference call.

PSTN Conferencing—Viewer Side

Figure 5:
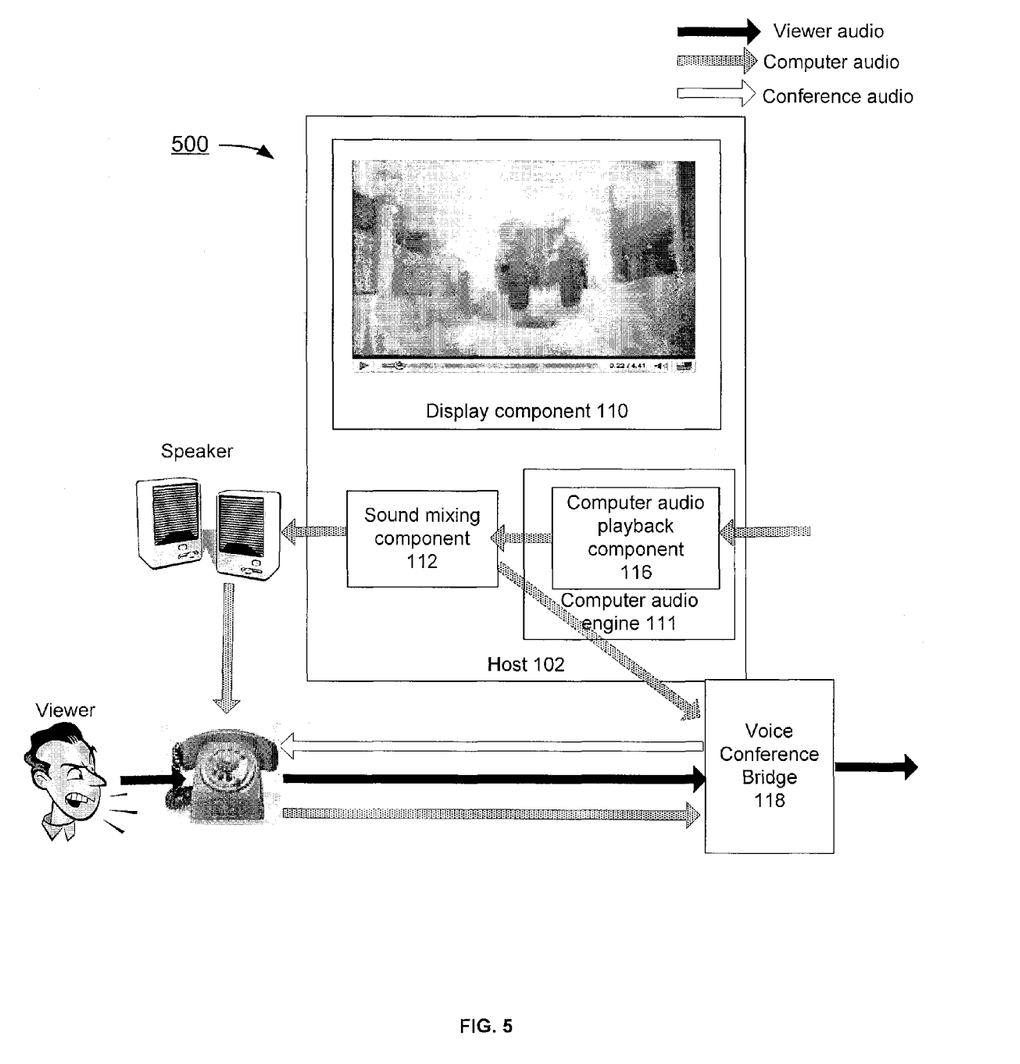
FIG. 5 depicts an example of a diagram of system to support canceling computer audio from voice audio of a viewer conferencing through a PSTN telephone.

FIG. 5 depicts an example of a diagram of system 500 to support canceling computer audio from voice audio of a viewer conferencing through a PSTN telephone, where the computer audio engine 111 further includes a computer audio playback component 116. Although some components in the figures are similar to those depicted in FIG. 3, the functionalities they perform and the connections among them may vary.

In the example of FIG. 5, the computer audio playback component 116 of the computer audio engine 111 is a software component that accepts audio streams from input to the host 102, process the accepted audio streams, and provides them to other components running on the host 102, such as the sound mixing component 112, for further processing or output to speakers associated with the host 102.

While the system 500 depicted in FIG. 5 is in operation, a PSTN telephone enables a viewer to participate in a conference call by listening to and speaking at the conference call via the voice conference bridge 118. The optional display component 110 of the host 102 receives and displays a presentation material or an application originated by a presenter at the conference call to the viewer. The computer audio playback component 116 of the computer audio engine 111 captures the computer audio stream of the application or material shared by the presenter and provides the audio stream to the sound mixing component 112 of the host 102. The sound mixing component 112 then accepts and outputs the computer audio to both a speaker for the viewer to listen to and optionally to the voice conference bridge 118 to process (if such computer audio is not otherwise provided to the voice conference bridge by the computer audio capturing component 114 on the presenter side in FIG. 3). From the viewer's side, the voice conference bridge 118 captures from the PSTN telephone one or more of: the viewer audio and the computer audio leaked from the speaker through the PSTN phone of the viewer. In addition, the voice conference bridge 118 also optionally captures the computer audio stream from the output of the sound mixing component 112 (if it does not accepts such computer audio stream from the computer audio capturing component 114 on the presenter side in FIG. 3). The voice conference bridge 118 then cancels the computer audio stream from the mix of the viewer audio stream and the computer audio stream, and transmits a clean viewer audio stream to the rest of the group of participants at the conference call. Note that if the computer audio stream is transmitted to the viewer via the voice conference bridge 118, there is no need for the computer audio capture and playback by the computer audio playback component 116 and echo cancellation by the voice conference bridge 118.

Figure 6:
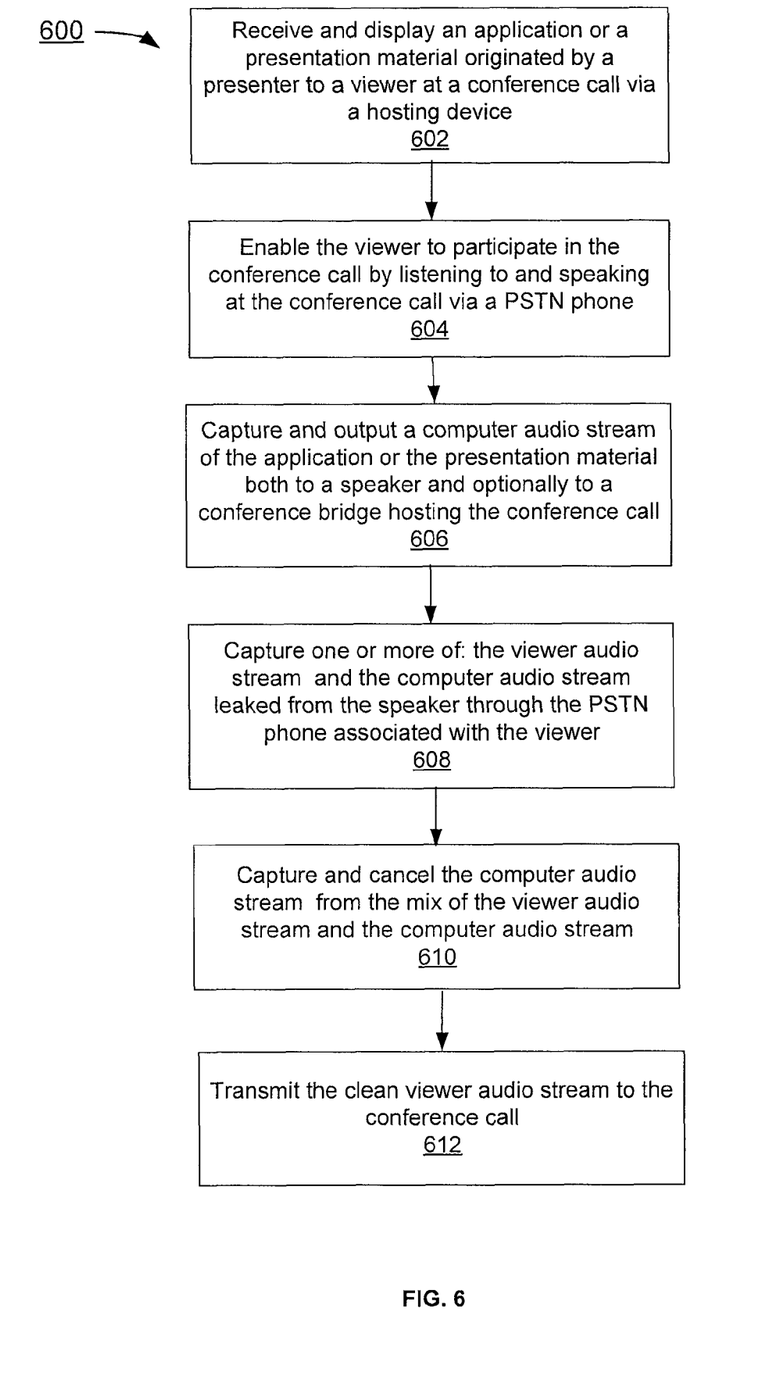
FIG. 6 depicts a flowchart of an example of a process to support canceling computer audio from voice audio of a viewer conferencing through a PSTN telephone.

FIG. 6 depicts a flowchart of an example of a process to support canceling computer audio from voice audio of a viewer conferencing through a PSTN telephone. In the example of FIG. 6, the flowchart 600 starts at block 602 where a presentation material or an application originated by a presenter is received and displayed to a viewer at the conference call via a hosting device. The flowchart 600 continues to block 604 where the viewer is enabled to participate in the conference call by listening to and speaking at the conference call via a PSTN phone. The flowchart 600 continues to block 606 where a computer audio stream of the application or material is captured and output both to a speaker and optionally to a voice conference bridge hosting the conference call. The flowchart 600 continues to block 608 where one or more of: a viewer audio stream and the computer audio stream leaked from the speaker through the PSTN phone associated with the viewer are captured the voice conference bridge. The flowchart 600 continues to block 610 where the computer audio stream is separately captured and canceled from the mix of the viewer audio stream and the computer audio stream by the voice conference bridge. The flowchart 600 ends at block 612 where a clean viewer audio stream is transmitted to the rest of the group of participants at the conference call.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more hosts to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human viewer or other mechanism utilizing the results of the present invention. Such software may include, but is not limited to, device drivers, operating systems, execution environments/containers, and applications.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Particularly, while the concept "component" is used in the embodiments of the systems and methods described above, it will be evident that such concept can be interchangeably used with equivalent concepts such as, class, method, type, interface, module, object model, and other suitable concepts. Embodiments were chosen and described in order to best describe the principles of the invention and its practical application, thereby enabling others skilled in the relevant art to understand the claimed subject matter, the various embodiments and with various modifications that are suited to the particular use contemplated.

What is claimed is:

1. A system, comprising:
a first host associated with a presenter, which in operation, runs a presentation material or an application at a conference call;
a first computer audio engine of the first host, which in operation, transmits a computer audio stream of the presentation material or the application to a viewer at the conference call;
said second host associated with said viewer;
a second computer audio engine of the second host, which in operation, accepts and plays back the incoming computer audio stream of the presentation material or application from the presenter;
a voice conference bridge, which in operation,
transmits a clean presenter audio stream to the viewer with other audio stream of echo or feedback canceled;
transmits a clean viewer audio stream to the viewer via the voice conference bridge hosting the conference call with other audio stream of echo or feedback canceled.

2. A system, comprising:
a first host associated with a presenter, which in operation, runs a presentation material or an application at a conference call;
a first computer audio engine of the first host, which in operation, transmits a computer audio stream of the presentation material or the application to a voice conference bridge;
said voice conference bridge, which in operation,
generates a clean presenter audio stream with other audio stream of echo or feedback canceled;
mixes and transmits the clean viewer audio stream to the viewer together with the computer audio stream.

3. The system of claim 1, further comprising:
a first display component of the first host, which in operation enables the presenter to display, manipulate, and share the application or the presentation material;
a second display component of the second host, which in operation receives and displays the application or the presentation material originated by the presenter to the viewer at the conference call.

4. The system of claim 1, wherein:
each of the first and the second host is a computing device, a communication device, s storage device, or any electronic device capable of running a software component.

5. A system, comprising:
a host associated with a presenter, which in operation, runs an application or a presentation material;
a PSTN telephone, which in operation, enables the presenter to participate in a conference call by listening to and speaking at the conference call;
a sound mixing component of the host, which in operation, captures and outputs a computer audio stream of the application or the presentation material to a speaker associated with the presenter;
a voice conference bridge, which in operation,
captures from the PSTN telephone one or more of: a presenter audio stream and the computer audio stream of the application or the presentation material leaked from the speaker;
captures separately the computer audio stream of the application or the presentation material;
cancels the computer audio stream from a mix of the presenter audio and the computer audio stream;
transmits the clean presenter audio stream to the conference call.

6. The system of claim 5, further comprising:
a display component of the host, which in operation enables the presenter to display, manipulate, and share the application or the presentation material at the conference call.

7. The system of claim 5, further comprising:
a computer audio capturing component of the host, which in operation,
captures from output of the sound mixing component the computer audio stream of the application or the presentation material;
outputs the computer audio stream of the application or the presentation material to the voice conference bridge.

8. The system of claim 5, wherein:
the voice conference bridge mixes and transmits the clean viewer audio stream together with the computer audio stream.

9. A system, comprising:
a host associated with a viewer, which in operation, receives an application or a presentation material originated by a presenter to a viewer at a conference call;
a PSTN telephone, which in operation, enables the viewer to participate in a conference call by listening to and speaking at a conference call;
a sound mixing component of the host, which in operation, captures and outputs a computer audio stream of the application or the presentation material shared by the presenter at the conference call to a speaker associated with the viewer;
a voice conference bridge, which in operation,
captures from the PSTN telephone one or more of: a voice audio stream of the viewer and the computer audio stream of the application or presentation material leaked through the speaker;
captures the computer audio stream of the application or the presentation material;
cancels the computer audio stream of the presentation material from a mix of the viewer audio stream and the computer audio stream;
transmits the clean viewer audio stream to the conference call.

10. The system of claim 9, further comprising:
a display component of the host, which in operation enables the viewer to display the application or the presentation material at the conference call.

11. The system of claim 9, further comprising:
a computer audio playback component of the host, which in operation,
captures the computer audio stream of the application or the presentation material;
plays back the computer audio stream of the presentation material to the sound mixing component.

12. The system of claim 9, wherein:
the sound mixing component outputs the computer audio stream to the voice conference bridge.

13. The system of claim 12, wherein:
the voice conference bridge captures the computer audio stream from the sound mixing component.

14. A computer-implemented method, comprising:
enabling a presenter to manipulate and share an application or a presentation material at a conference call;
transmitting a computer audio stream of the application or the presentation material to a viewer at the conference call;
enabling the presenter to listen to a voice audio stream from the viewer and speak a voice audio stream at the conference call;
transmitting a clean voice audio stream of the presenter to the viewer via a voice conference bridge hosting the conference call with other audio stream of echo or feedback canceled;
receiving the application or the presentation material originated by the presenter to the viewer at a conference call;
accepting and playing back the incoming computer audio stream of the application or the presentation material from the presenter;
enabling the viewer to listen to the audio stream from the presenter and speaking a voice audio stream at the conference call;
transmitting a clean viewer voice audio stream to the presenter via the voice conference bridge hosting the conference call with other audio stream of echo or feedback canceled.

15. A computer-implemented method, comprising:
enabling a presenter to manipulate and share an application or a presentation material at a conference call;
transmitting a computer audio stream of the application or the presentation material to a voice conference bridge;
enabling the presenter to listen to a voice audio stream from the viewer and speak a voice audio stream at the conference call;
generating a clean voice audio stream of the presenter via the voice conference bridge hosting the conference call with other audio stream of echo or feedback canceled;
mixing and transmitting the voice audio stream of the presenter together with the computer audio stream;
enabling the viewer to listen to the audio stream from the presenter and to speak a voice audio stream at the conference call;
transmitting a viewer voice audio stream to the presenter via the voice conference bridge hosting the conference call.

16. The method of claim 14, further comprising:
enables the presenter to display, manipulate, and share the application or the presentation material;
receives and displays the application or the presentation material originated by the presenter to the viewer at the conference call.

17. A computer-implemented method, comprising:
enabling a presenter to participate in a conference call by listening to and speaking at the conference call via a PSTN phone;
enabling the presenter manipulate and share a presentation material at the conference call;
capturing and outputting a computer audio stream of an application or a presentation material or application to a speaker associated with the presenter;
capturing from the PSTN telephone one or more of: a presenter audio stream and the computer audio stream of the application or the presentation material leaked from the speaker;
capturing separately the computer audio stream of the application or the presentation material;
canceling the computer audio stream from a mix of the presenter audio and the computer audio stream;
transmitting the clean presenter audio stream to the conference call.

18. The method of claim 17, further comprising:
enabling the presenter to display the application or the presentation material at the conference call.

19. The method of claim 17, further comprising:
mixing and transmitting the clean viewer audio stream together with the computer audio stream.

20. A computer-implemented method, comprising:
receiving an application or a presentation material originated by a presenter to a viewer at a conference call;
enabling the viewer to participate in the conference call by listening to and speaking at the conference call via a PSTN phone;
capturing and playing back a computer audio stream of the application or the presentation material shared by the presenter at the conference call to a speaker associated with the viewer;
capturing by the PSTN telephone one or more of: a voice audio stream of the viewer and the computer audio stream of the application or the presentation material leaked through the speaker;
capturing the computer audio stream of the application or the presentation material;
canceling the computer audio stream of the presentation material from a mix of the viewer audio stream and the computer audio stream;
transmitting the clean viewer audio stream to the conference call.

21. The method of claim 20, further comprising:
enabling the viewer to display the application or the presentation material at the conference call.

22. The method of claim 20, further comprising:
outputting the computer audio stream of the application or the presentation material to a voice conference bridge.

* * * * *

UNITED STATES PATENT AND TRADEMARK OFFICE
CERTIFICATE OF CORRECTION

| | | |
|---|---|---|
| PATENT NO. | : 8,223,943 B2 | Page 1 of 1 |
| APPLICATION NO. | : 12/423467 | |
| DATED | : July 17, 2012 | |
| INVENTOR(S) | : Albert Alexandrov et al. | |

It is certified that error appears in the above-identified patent and that said Letters Patent is hereby corrected as shown below:

Title page 1 of the patent, the second inventor's name is misspelled as Florlian Winterstein.
Please correct the spelling to read Florian Winterstein.

Signed and Sealed this
Fourth Day of September, 2012

David J. Kappos
*Director of the United States Patent and Trademark Office*